United States Patent
Huang et al.

(10) Patent No.: US 11,971,573 B2
(45) Date of Patent: Apr. 30, 2024

(54) MULTI-LAYER WAVEGUIDE OPTICAL COUPLER

(71) Applicant: Taiwan Semiconductor Manufacturing Company, Hsinchu (TW)

(72) Inventors: Tai-Chun Huang, New Taipei (TW); Stefan Rusu, Sunnyvale, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/832,781

(22) Filed: Jun. 6, 2022

(65) Prior Publication Data

US 2023/0393333 A1    Dec. 7, 2023

(51) Int. Cl.
*G02B 6/12* (2006.01)
*G02B 6/122* (2006.01)
*G02B 6/13* (2006.01)

(52) U.S. Cl.
CPC ....... *G02B 6/12002* (2013.01); *G02B 6/1228* (2013.01); *G02B 6/13* (2013.01); *G02B 2006/12038* (2013.01)

(58) Field of Classification Search
CPC .................. G02B 6/12002; G02B 6/29331
See application file for complete search history.

(56) References Cited

U.S. PATENT DOCUMENTS 10,663,663 B2 * 5/2020 Painchaud ........... G02B 6/1228
11,567,261 B2 * 1/2023 Bian ........................ G02B 6/14
2003/0235227 A1 * 12/2003 Chand .................. G02B 6/1228
                                                                     372/50.1
2014/0294341 A1 * 10/2014 Hatori .................. G02B 6/1228
                                                                     385/14
2015/0346431 A1    12/2015 Budd et al.

FOREIGN PATENT DOCUMENTS

| CN | 112764159 A | 5/2021 |
|---|---|---|
| CN | 113176631 A | 7/2021 |
| JP | 2018156104 A | 10/2018 |
| TW | 201140177 A | 11/2011 |
| TW | 201300857 A | 1/2013 |
| TW | 201812359 A | 4/2018 |
| TW | 202004241 A | 1/2020 |
| TW | 202139268 A | 10/2021 |

* cited by examiner

*Primary Examiner* — Charlie Y Peng
(74) *Attorney, Agent, or Firm* — Lippes Mathias LLP

(57) ABSTRACT

An optical coupler includes: a plurality of waveguide core layers formed from a waveguide core material having a first index of refraction, the waveguide core layers being (i) arranged in a stacked relationship one over another, (ii) spaced apart one from another and (iii) extending from a light receiving end of the optical coupler longitudinally through the optical coupler toward a light output end of the optical coupler; and a cladding formed from a cladding material having a second index of refraction, the second index of refraction being less than the first index of refraction, the cladding material surrounding each of the plurality of waveguide core layers. Suitably, light propagating within outer ones of the plurality of waveguide core layers is directed toward an interior one of the plurality of waveguide core layers via evanescent coupling between adjacent ones of the plurality of waveguide core layers.

20 Claims, 10 Drawing Sheets

MULTI-LAYER WAVEGUIDE OPTICAL COUPLER

BACKGROUND

The following relates to the semiconductor arts, and in particular, to a method and/or apparatus for effective optical coupling of light output from a light source, for example, such as a laser diode.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features as shown in the accompany figures may be arbitrarily increased or reduced for clarity of discussion.

DETAILED DESCRIPTION

Figure 1:
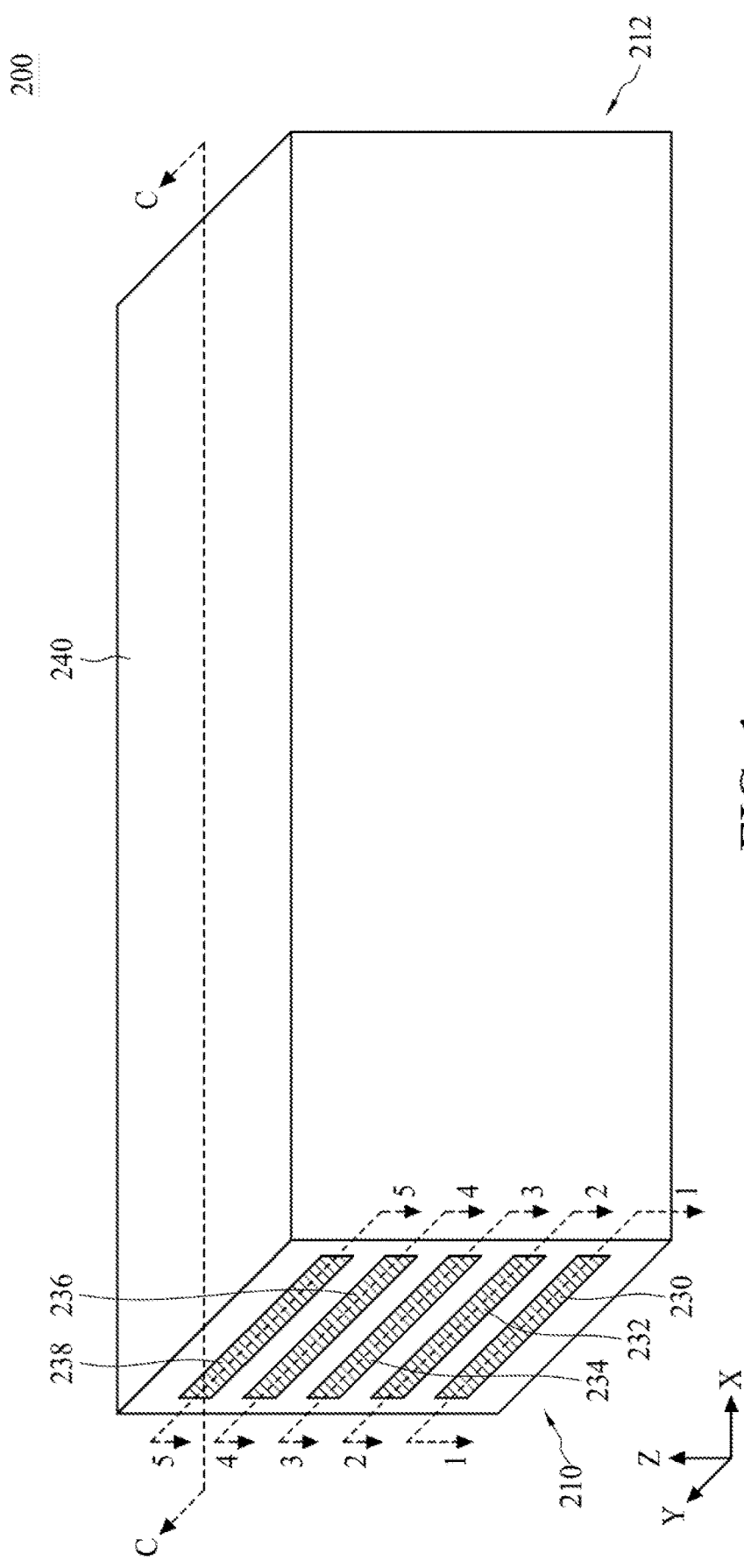
FIG. 1 diagrammatically illustrates a perspective view of an optical coupler in accordance with some embodiments disclosed herein.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "left," "right," "side," "back," "rear," "behind," "front," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, there is disclosed herein an optical coupler, for example, suitable for photonic platforms, which includes a three-dimensional (3D) multi-layer silicon waveguide. In some suitable embodiments, the 3D multi-layer waveguide may be included in and/or as part of a silicon photonic platform, for example, such as a photonic integrated circuit (PIC) or an integrated optical circuit, which may also include an integrated laser chip or die that acts as a source of light which is input to the optical coupler. One advantage of the disclosed 3D multi-layer waveguide design is improved vertical alignment tolerance and/or easing of alignment and/or manufacturing process constraints between a light source, for example, such as a laser diode, and the optical coupler, while retaining a high optical coupling efficiency and/or low power loss therebetween.

In some suitable embodiments, a silicon nitride ($Si_3N_4$), silicon and/or another like material may be employed as the waveguide core(s), i.e., the material in which the light is propagated. One advantage of using silicon nitride is that it is relatively highly thermodynamically stable, and hence, may help avoid unwanted influence and/or undesirable effects associated with temperature fluctuations or the like. In some suitable embodiments, a cladding surrounding the waveguide core material may be formed from and/or of a silicon dioxide ($SiO_2$) and/or another suitable oxide or cladding material. Suitably, the waveguide cladding material has a relatively lower index of refraction as compared to an index of refraction of the waveguide core material.

In some embodiments, a high-calibrated tolerance multi-layer laser optical waveguide coupler is based on a silicon insulator platform. One advantage of some embodiments is that the optical coupler can be widely used for direct coupling of laser beams. The use of a multi-layer symmetric structure in the optical coupler can significantly reduce the manufacturing process constraints and/or improve the calibration tolerance, for example, in the vertical direction, while effectively converging or funneling the light energy into one of the waveguide cores of the optical coupler for wave propagation.

In some embodiments, there may be a certain cavity, gap or distance between an output end of the laser light source, for example, a laser diode, and an input end of the optical 3D multi-layer waveguide coupler, for example, as a result of the manufacturing process employed. In practice, this cavity or gap may be, for example, in a range of between about 0.1 micrometers (μm) wide and about 100 μm wide, inclusive. In some suitable embodiments, this cavity or gap may suitably be filled with a material, for example, such as a high dielectric constant (high-k) material, sol-gel and/or other like material. For example, the cavity or gap filling material may have an index of refraction in a range of between about 1.1 and about 3.9, inclusive. In some suitable embodiments, the cavity or gap filling material is selected or chosen to effectively match or transition to the index of refraction of the waveguide core material. Advantageously, the index matching cavity/gap filling material may be chosen and/or act to limit the optical mode, for example, so that the laser light field produced by the light source and the receiving end of the optical coupler are modal matched, thereby reducing loss and/or improving coupling efficiency. That is to say, advantageously, the cavity/gap filling material may help to inhibit the gap from behaving as a resonance cavity and/or reduce internal reflections at the interface with the light receiving end of the optical coupler.

For ease of reference and illustrative purposes herein, the FIGURES and the various elements and/or components depicted therein are shown relative to an otherwise arbitrarily chosen 3D cartesian coordinate system including X, Y and Z axes as shown in the FIGURES. While consistency is maintained among and/or across the various FIGURES, it is to be appreciated the directions and/or orientations indicated by these axes are chosen primarily for the purpose of facilitating the description provided herein, for example, to describe and/or identify relative orientations and/or directions. Unless otherwise indicated, the illustrated coordinate system, in and of itself, is not intended to be limiting and should not be read or interpreted as such.

FIG. 1 shows a three-dimensional (3D) multi-layer waveguide optical coupler 200 according to some suitable embodiments disclosed herein. As shown, the optical coupler 200 includes a first light receiving or input end 210 and a second light output end 212, opposite the first end 210. As shown, the optical coupler 200 includes a plurality of waveguide core layers 230, 232, 234, 236 and 238 arranged vertically (for example, in a direction of the Z axis) one over the other and extending longitudinally (for example in a direction of the X axis) within the optical coupler 200, which core layers 230, 232, 234, 236 and 238 are encased in and/or surrounded by a cladding 240.

Figure 2:
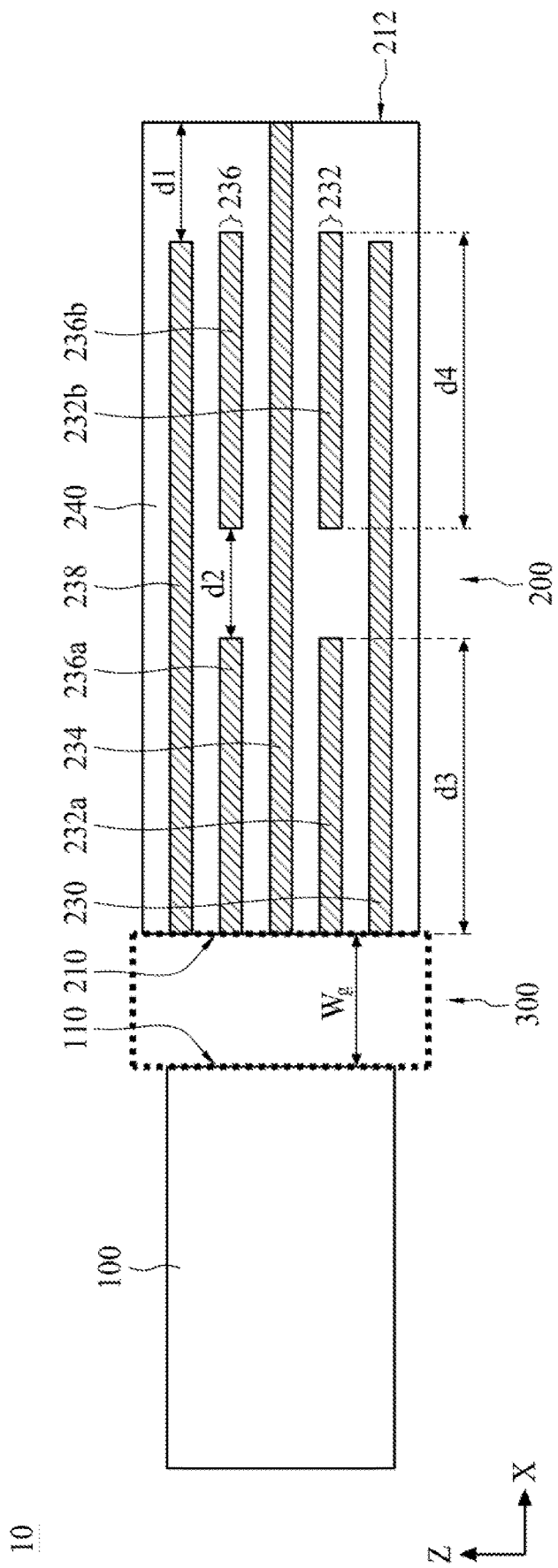
FIG. 2 diagrammatically illustrates an embodiment of a photonic apparatus including a side cross-section view (taken along section line C-C) of the optical coupler shown in FIG. 1.

With reference now to FIG. 2, there is shown a photonic apparatus 10 including a light source 100 and the optical coupler 200 according to some suitable embodiments disclosed herein. In some suitable embodiments, the photonic apparatus 10 may be a PIC or an integrated optical circuit. Accordingly, the light source 100 and the optical coupler 200, in some suitable embodiments, may be built-up and/or otherwise formed on a common silicon wafer or other suitable substrate (not shown) using any one or more of a variety of semiconductor manufacturing process steps, including but not limited to front end of line (FEOL), middle end of line (MEOL) and back end of line (BEOL) semiconductor manufacturing processes. For example, any one or more of various semiconductor manufacturing process steps may be carried out to form and/or otherwise create the light source 100 and/or the optical coupler 200, including, but not limited to: wafer cleaning and/or other substrate preparation steps; material deposition steps to build-up and/or create a variety of thin films and/or layers of material, for example, using chemical vapor deposition (CVD), plasma-enhanced CVD (PECVD), atomic layer deposition (ALD), physical layer deposition (PLD), sputtering, epitaxial growth, molecular-beam epitaxy (MBE), and/or other thin film or layer depositing and/or growing steps; material forming and/or patterning steps, like photolithography, including photoresist application, exposure, developing and etching (for example, such as dry or plasma etching and/or wet etching); other material removal and/or planarization steps such as chemical mechanical polishing (CMP) or the like; n-type or p-type or other doping, ion implantation, annealing, oxidation and/or other material modification steps; via formation and/or metallization steps; wafer back-grinding and/or polishing; die preparation and/or wafer dicing steps; encapsulation steps; wafer and/or die testing or other metrology; etc.

In some suitable embodiments, the light source 100 may be a laser diode or the like that emits laser light or the like from a light emitting end 110 thereof, for example, generally in a direction of the X axis. In some suitable embodiments, the emitted light may be in the infrared (IF), or more specifically the near-IR, region of the electromagnetic spectrum. In some embodiments, the emitted light may be in a range of wavelengths between about 1260 nanometers (nm) and about 1360 nm, inclusive.

Figure 3:
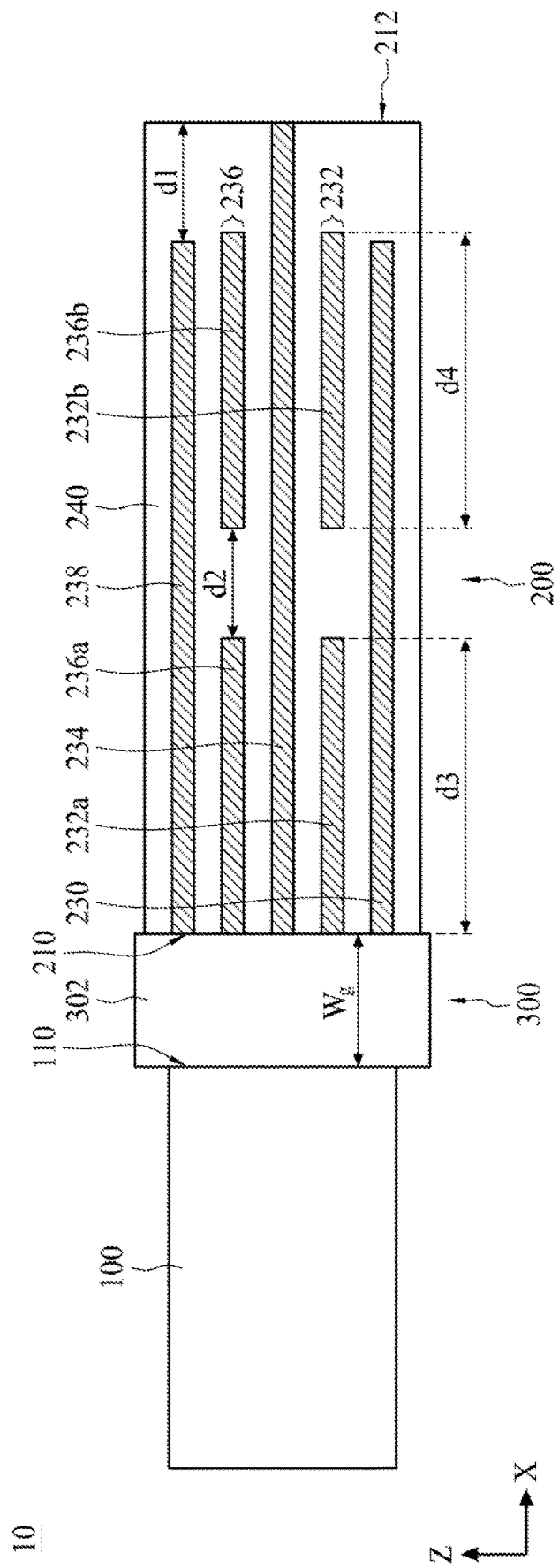
FIG. 3 diagrammatically illustrates another embodiment of a photonic apparatus including a side cross-section view (taken along section line C-C) of the optical coupler shown in FIG. 1.

As shown in FIG. 2, the light emitting end 110 of the light source 100 faces the light receiving end 210 of the optical coupler 200. In some suitable embodiments, the light emitting end 110 of the light source 100 is spaced apart from the light receiving end 210 of the optical coupler 200, for example, forming a cavity or gap 300 therebetween. In practice, a width $w_g$ (for example, measured in a direction of the X axis) of the gap 300 may be, for example, in a range of between about 0.1 μm and about 100 μm, inclusive. In some suitable embodiments, as shown in FIG. 3 for example, the cavity or gap 300 may be filled with a suitable filler material 302. Suitably, the cavity or gap filling material 302 may be a high-k material, sol-gel or the like. In practice, the fill material 302 suitably acts as a refractive index matching material helping to reduce or limit internal reflections of light propagating within the fill material 302, for example, at the interface between the fill material 302 and the light receiving end 210 of the optical coupler 200, thereby encouraging or otherwise promoting transmission of the light into the optical coupler 200 at this interface. In some suitable embodiments, the cavity or gap filling material 302 may have an index of refraction in a range of between about 1.1 and about 3.9, inclusive. In some other alternative embodiments, the cavity or gap 300 may remain unfilled or otherwise be simply filled with air, i.e., the cavity/gap 300 may essentially comprise an air gap, as shown in FIG. 2 for example.

Figure 4:
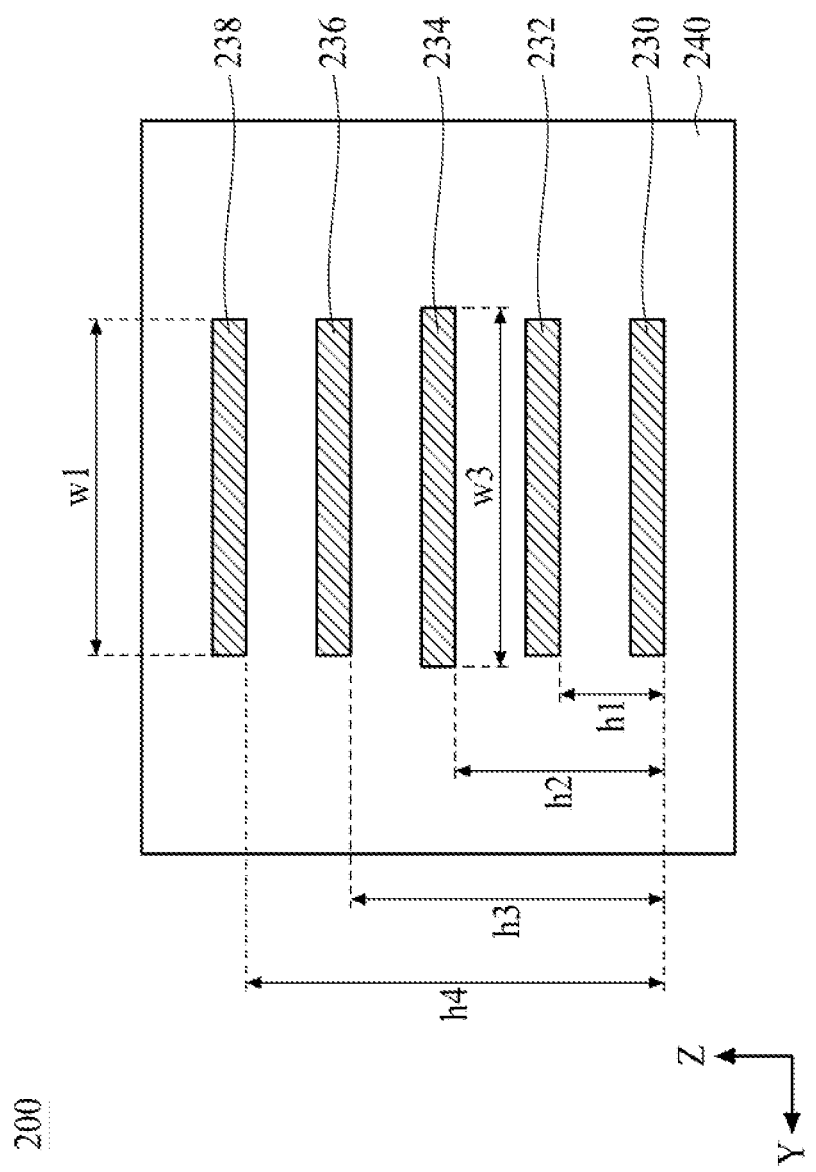
FIG. 4 diagrammatically illustrates a plan view of a light receiving and/or input end of the optical coupler shown in FIG. 1.

As shown in FIGS. 2-4 for example, the 3D multi-layer optical coupler 200 includes a plurality of waveguide core layers, including: a first waveguide core layer 230, a second waveguide core layer 232, a third waveguide core layer 234, a fourth waveguide core layer 236 and a fifth waveguide core layer 238. More generally, the first, second, fourth and fifth waveguide core layers 230, 232, 236 and 238 may be referred to herein from time to time as the outer waveguide core layers, while the third waveguide core layer 234 may be referred to herein from time to time as the central or middle waveguide core layer; the first and fifth waveguide core layers 230 and 238 may be referred to herein from time to time as the outermost waveguide core layers; and the second and fourth waveguide core layers 232 and 236 may be referred to herein from time to time as the intermediate waveguide core layers.

Suitably, as seen in FIGS. 2 and 3, each waveguide core layer 230, 232, 234, 236 and 238 has a first end at or near the light receiving end 210 of the optical coupler 200 and extends longitudinally (for example, in a direction of the X axis) through the optical coupler 200 therefrom. In practice, the first ends of each waveguide core layer 230, 232, 234, 236 and 238 face the light emitting end 110 of the light source 100 and/or are exposed to light emitted from the light source 100. In some suitable embodiments, the central or middle waveguide core layer 234 extends all the way or substantially all the way to the light output end 212 of the optical coupler 200, opposite the light receiving or input end 210 of the optical coupler 200. Conversely, the outer or first, second, fourth and fifth waveguide core layers 230, 232, 236 and 238 stop short of extending all the way to the light output end 212 of the optical coupler by an amount or distance d1, for example, measured in a direction of the X axis. In some suitable embodiments, the distance d1 may be, for example, in a range of between about 20 μm and about 200 μm, inclusive.

In some suitable embodiments, the waveguide core layers 230, 232, 234, 236 and 238 may be formed from and/or of a suitable waveguide core material, for example, such as a silicon nitride ($Si_3N_4$), silicon and/or another dielectric or other like material suitable for the propagation of light therein, at least for light having wavelengths at or near the operating wavelength of the light source 100, i.e., at or about the wavelength of the light emitted from the light source 100. In some suitable embodiments, each of the waveguide core layers 230, 232, 234, 236 and 238 is formed from and/or of the same waveguide core material. In other suitable embodiments, one or more of the various waveguide core layers 230, 232, 234, 236 and 238 may be formed from and/or of waveguide core material different from one or more of the others. Suitably, a thickness, for example, measured in a direction of the Z axis, of each of the waveguide core layers 230, 232, 234, 236 and 238 may be in a range of between about 15 nm and about 1000 nm, inclusive. In some embodiments, each of the waveguide core layers 230, 232, 234, 236 and 238 may have the same thickness, while in other embodiments, one or more of the various waveguide core layers 230, 232, 234, 236 and 238 may have a thickness different from one or more of the others.

In some suitable embodiments, the waveguide core layers 230, 232, 234, 236, and 238 are surrounded by and/or encased in a cladding 240. Suitably, the cladding 240 may be formed from and/or of a silicon dioxide ($SiO_2$) and/or another suitable oxide or cladding material. In practice, the waveguide cladding material has an index of refraction $n_1$ which is less than an index of refraction $n_2$ of the waveguide core material, at least for light having wavelengths at or near the operating wavelength of the light source 100, i.e., at or about the wavelength of the light emitted from the light source 100. Accordingly, light from the light source 100 which is launched into or otherwise enters the waveguide core layers 230, 232, 234, 236 and 238, for example, from the light receiving end 210 of the optical coupler 200, may be largely contained to propagate (for example, generally in the direction of the X axis) within the waveguide core layers 230, 232, 234, 236 and 238, for example, by total internal reflection (TIR) and/or frustrated TIR (FTIR).

Figure 5:
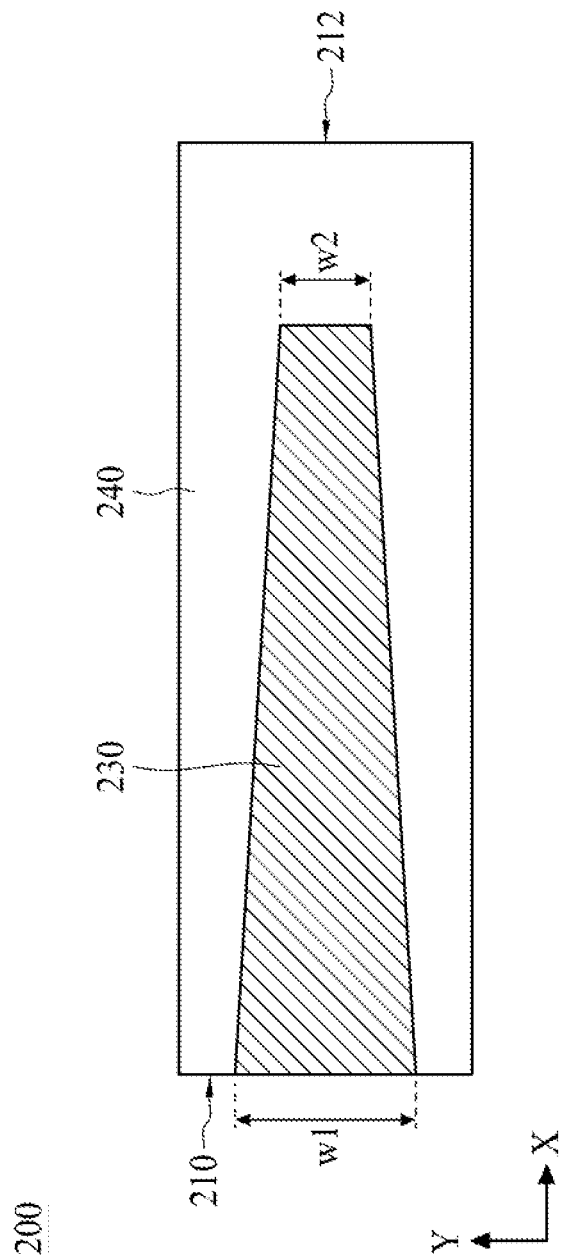
FIG. 5 diagrammatically illustrates a top cross-section view (taken along section line 1-1) of the optical coupler shown in FIG. 1.
Figure 9:
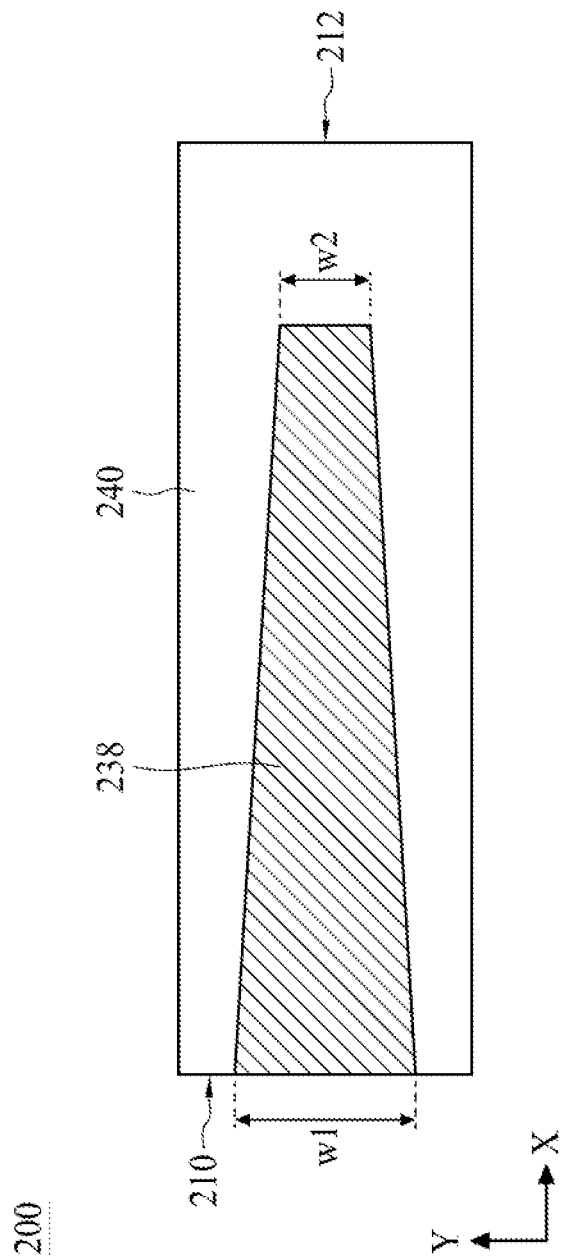
FIG. 9 diagrammatically illustrates a top cross-section view (taken along section line 5-5) of the optical coupler shown in FIG. 1.

As shown in FIGS. 5 and 9 for example, the outermost waveguide core layers 230 and 238 may be linearly or otherwise tapered, for example, to change, control or regulate the size and/or shape of light propagating therethrough, for example, generally in a direction of the X axis. That is to say, the taper may function to change the size and/or shape of the optical mode carried in the outermost waveguide core layers 230 and 238. In some suitable embodiments, the taper is sufficiently gradual and/or otherwise formed such that it operates adiabatically and/or with limited transmission losses, for example, in the Y axis direction. As shown in FIGS. 5 and 9, the outermost waveguide core layers 230 and 238 taper from a first width w1 (for example, measured in a direction of the Y axis) at and/or proximate to the light receiving end 210 of the optical coupler 200 to a second width w2 (for example, measured in a direction of the Y axis) distal from the light receiving end 210 of the optical coupler 200, where the second width w2 is less than the first width w1. In some suitable embodiments, the first width w1 may be in a range of between about 380 nm and about 3000 nm, inclusive. In some suitable embodiments, the second width w2 may be in a range of between about 100 nm and about 3000 nm, inclusive.

Figure 6:
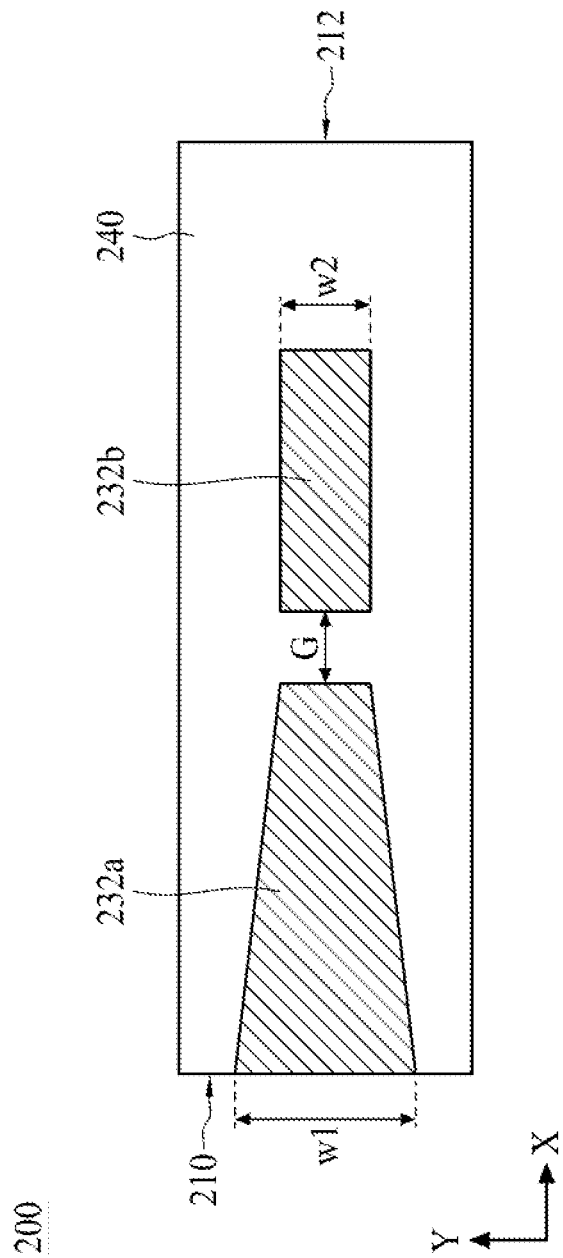
FIG. 6 diagrammatically illustrates a top cross-section view (taken along section line 2-2) of the optical coupler shown in FIG. 1.
Figure 8:
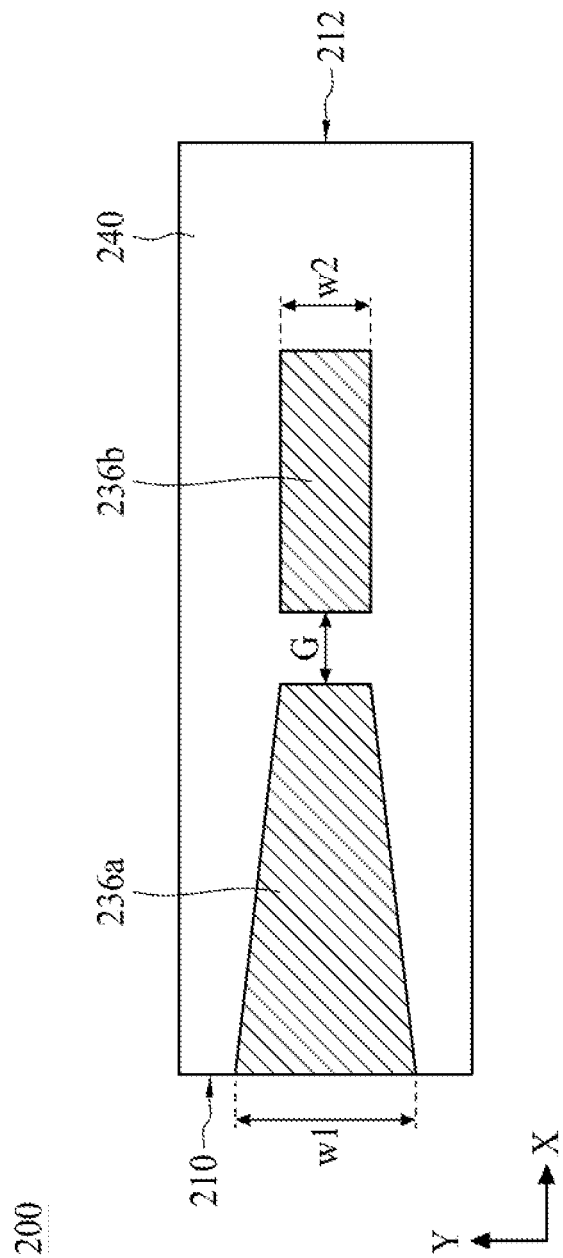
FIG. 8 diagrammatically illustrates a top cross-section view (taken along section line 4-4) of the optical coupler shown in FIG. 1.

As shown in FIGS. 6 and 8, the intermediate waveguide core layers 232 and 236 are discontinuous along a general direction of light propagation, i.e., in a direction of the X axis. That is to say, in some suitable embodiments, the intermediate waveguide core layers 232 and 236 may be separated into first portions 232a and 236a and second portions 232b and 236b separated by a gap G within which is disposed a portion of the cladding 240 interposed between the respective first portions 232a and 236a and second portions 232b and 236b of the intermediate waveguide core layers 232 and 236. It is also noted that while in the illustrative example the two intermediate waveguide core layers 232 and 236 include the gap G, in more general embodiments two or more waveguide core layers (typically intermediate layers) may include the gap. For example, if there are nine layers then it is contemplated for the intermediate second, fourth, sixth, and eighth intermediate layers to include such a gap G.

In some suitable embodiments, the second portions 232b and 236b of the intermediate waveguide core layers 232 and 236 are offset from the first portions 232a and 236a of the intermediate waveguide core layers 232 and 236 by an offset amount or distance d2, for example, measured in the direction of the X axis. In some suitable embodiments, the offset amount or distance d2 may be in a range of between about 1 μm and about 10 μm, inclusive. As shown in FIGS. 6 and 8, the first portions 232a and 236a of the intermediate waveguide core layers 232 and 236 may extend from the light receiving or input end 210 of the optical coupler 200 longitudinally through the optical coupler 200 in a direction of the X axis for a distance d3, and following or after the offset, the second portions 232b and 236b of the intermediate waveguide core layers 232 and 236 may continue to extend longitudinally through the optical coupler 200 in a direction of the X axis for a distance d4 toward the light output end 212 of the optical coupler 200. Suitably, the distance d4 is less than or equal to the distance d3 and in some suitable embodiments the distance d4 is in a range of between about 10% and about 100%, inclusive, of the distance d3. Suitably, the distance d3 may be in a range of between about 10 μm and about 25 μm, inclusive; and the distance d4 may be in a range of between about 1 μm and about 25 μm, inclusive. In some embodiments, the offset amount or distance d2 is in a range of between about 10% and about 50%, inclusive, of the distance d3.

Advantageously, the geometries, dimensions and/or arrangements of the intermediate waveguide core layers 232 and 236 as disclosed herein, including the offsets and/or discontinuities in the intermediate waveguide core layers 232 and 236, can help to inhibit and/or discourage unwanted coupling and/or transmission of light and/or its associated energy (for example, via evanescent or near-field effects) to and/or toward the outermost waveguide core layers 230 and 238, while conversely helping to urge and/or encourage coupling and/or transmission of light and/or its associated energy (for example, via evanescent or near-field effects) to and/or towards the central or middle waveguide core layer 234.

As shown in FIGS. 6 and 8 for example, the first portions 232a and 236a of the intermediate waveguide core layers 232 and 236 may be linearly or otherwise tapered, for example, to change, control or regulate the size and/or shape of light propagating therethrough, for example, generally in a direction of the X axis. That is to say, the taper may function to change the size and/or shape of the optical mode carried in the intermediate waveguide core layers 232 and 236. In some suitable embodiments, the taper is sufficiently gradual and/or otherwise formed such that it operates adiabatically and/or with limited transmission losses, for example, in the Y axis direction. As shown in FIGS. 6 and 8, the first portions 232a and 236a of the intermediate waveguide core layers 232 and 236 taper from the first width w1 (for example, measured in a direction of the Y axis) at and/or proximate to the light receiving end 210 of the optical coupler 200 to the second width w2 (for example, measured in a direction of the Y axis) distal from the light receiving end 210 of the optical coupler 200.

Figure 7:
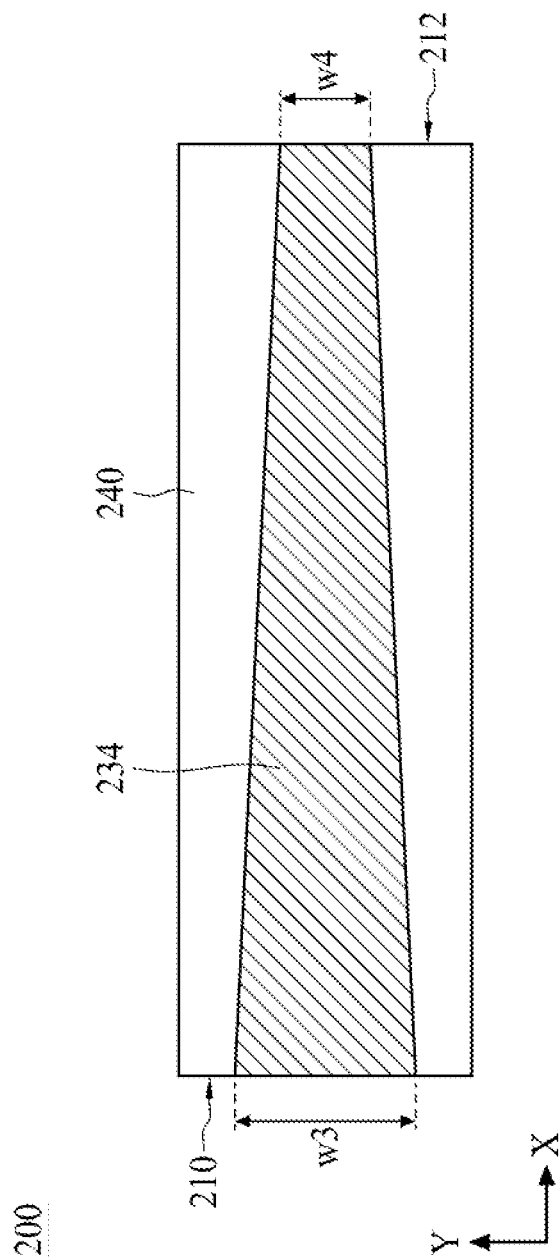
FIG. 7 diagrammatically illustrates a top cross-section view (taken along section line 3-3) of the optical coupler shown in FIG. 1.

As shown in FIG. 7 for example, the central or middle waveguide core layer 234 may also be linearly or otherwise tapered, for example, to change, control or regulate the size and/or shape of light propagating therethrough, for example, generally in a direction of the X axis. Again, that is to say, the taper may function to change the size and/or shape of the optical mode carried in the central or middle waveguide core layer 234. In some suitable embodiments, this taper is also sufficiently gradual and/or otherwise formed such that it operates adiabatically and/or with limited transmission losses, for example, in the Y axis direction. As shown in FIG. 7, the central or middle waveguide core layer 234 tapers from a first width w3 (for example, measured in a direction of the Y axis) at and/or proximate to the light receiving end 210 of the optical coupler 200 to a second width w4 (for example, measured in a direction of the Y axis) at and/or proximate to the light output end 212 of the optical coupler 200. In some suitable embodiments, the first width w3 may be in a range of between about 400 nm and about 3200 nm, inclusive. In some suitable embodiments, the second width w4 may be in a range of between about 100 nm and about 3000 nm, inclusive. In some suitable embodiments, the first width w4 of the central or middle waveguide core layer 234 is greater than the first width w1 of the outer waveguide core layers 230, 232, 236 and 238. In some suitable embodiments, the width w1 may be, for example, in a range of between about 90% and about 98%, inclusive, of the width w4.

With particular attention now to FIG. 4, the first, second, third, fourth and fifth waveguide core layers 230, 232, 234, 236 and 238 are arranged one above and/or over another and vertically (for example, in a direction of the Z axis) spaced apart from one another, as shown, by the cladding 240. In some suitable embodiments, the spacings between the first, second, third, fourth and fifth waveguide core layers 230, 232, 234, 236 and 238 are selected and/or arranged to permit, aid, encourage and/or promote evanescent and/or near-field coupling and/or transmission of light from the outer waveguide core layers (i.e., waveguide core layers 230, 232, 236 and 238) to and/or toward the central or middle waveguide core layer (i.e., waveguide cord layer 234). That is to say, light propagating in the outmost waveguide core layers 230 and 238 is transmitted to the intermediate waveguide core layers 232 and 236, respectively, for example, by way of evanescent and/or near-field coupling therebetween or the like; and, light propagating in the intermediate waveguide core layers 232 and 236 is transmitted to the central or middle waveguide core layer 234, for example, by way of evanescent and/or near-field coupling therebetween or the like.

In practice, the light emitted from the light source 100 may enter one or more of the waveguide core layers 230, 232, 234, 236 and/or 238 at its exposed end proximate the light receiving or input end 210 of the optical coupler 200, for example, due to the vertical (for example, in the Z axis direction) divergence of the emitted light from the light source 100 and/or due to the vertical (for example, in the Z axis direction) alignment between the light emitting end 110 of the light source 100 and the light receiving end 210 of the optical coupler 200. Accordingly, in some suitable embodiments, the optical coupler 200 acts to funnel, direct and/or otherwise urge the received light and/or its associated energy from the outer waveguide core layers 230, 232, 236 and 238 into and/or toward the central or middle waveguide core layer 234 for propagation to the output end 212 of the optical coupler 200. In some suitable embodiments, the relative spacings between, geometry, tapers and/or dimensions of the waveguide core layers 230, 232, 234, 236 and 238, along with the offsets between the first portions 232a and 236a and the second portions 232b and 236b of the intermediate waveguide layers 232 and 236 can aid in promoting, encouraging, funneling, converging and/or otherwise directing or urging light and/or its associated energy to and/or toward the central or middle waveguide core layer 234, for example, while inhibiting or discouraging the coupling and/or transmission of light and/or its associated energy back outward toward the outermost waveguide core layers 230 and 238.

In some suitable embodiments, the second waveguide core layer 232 is spaced from the first waveguide core layer 230 by a distance or height h1 (for example, measured in a direction of the Z axis); the third waveguide core layer 234 is spaced from the first waveguide core layer 230 by a distance or height h2 (for example, measured in a direction of the Z axis); the fourth waveguide core layer 236 is spaced from the first waveguide core layer 230 by a distance or height h3 (for example, measured in a direction of the Z axis); and the fifth waveguide core layer 238 is spaced from the first waveguide core layer 230 by a distance or height h4 (for example, measured in a direction of the Z axis). In some suitable embodiments, the height h1 is in a range of between about 6% and about 13%, inclusive, of a value h, where h, for example, is in a range of between about 1 µm and about 4 µm, inclusive. In some suitable embodiments, the height h2 is in a range of between about 12% and about 26%, inclusive, of the value h. In some suitable embodiments, the height h3 is in a range of between about 18% and about 39%, inclusive, of the value h. In some suitable embodiments, the height h4 is in a range of between about 24% and about 52%, inclusive, of the value h. In some suitable embodiments, a difference Δh between any two consecutive heights (i.e., between h2 and h1, between h3 and h2 and between h4 and h3) may be in a range of between about 50 nm and about 1000 nm, inclusive.

Figure 10:
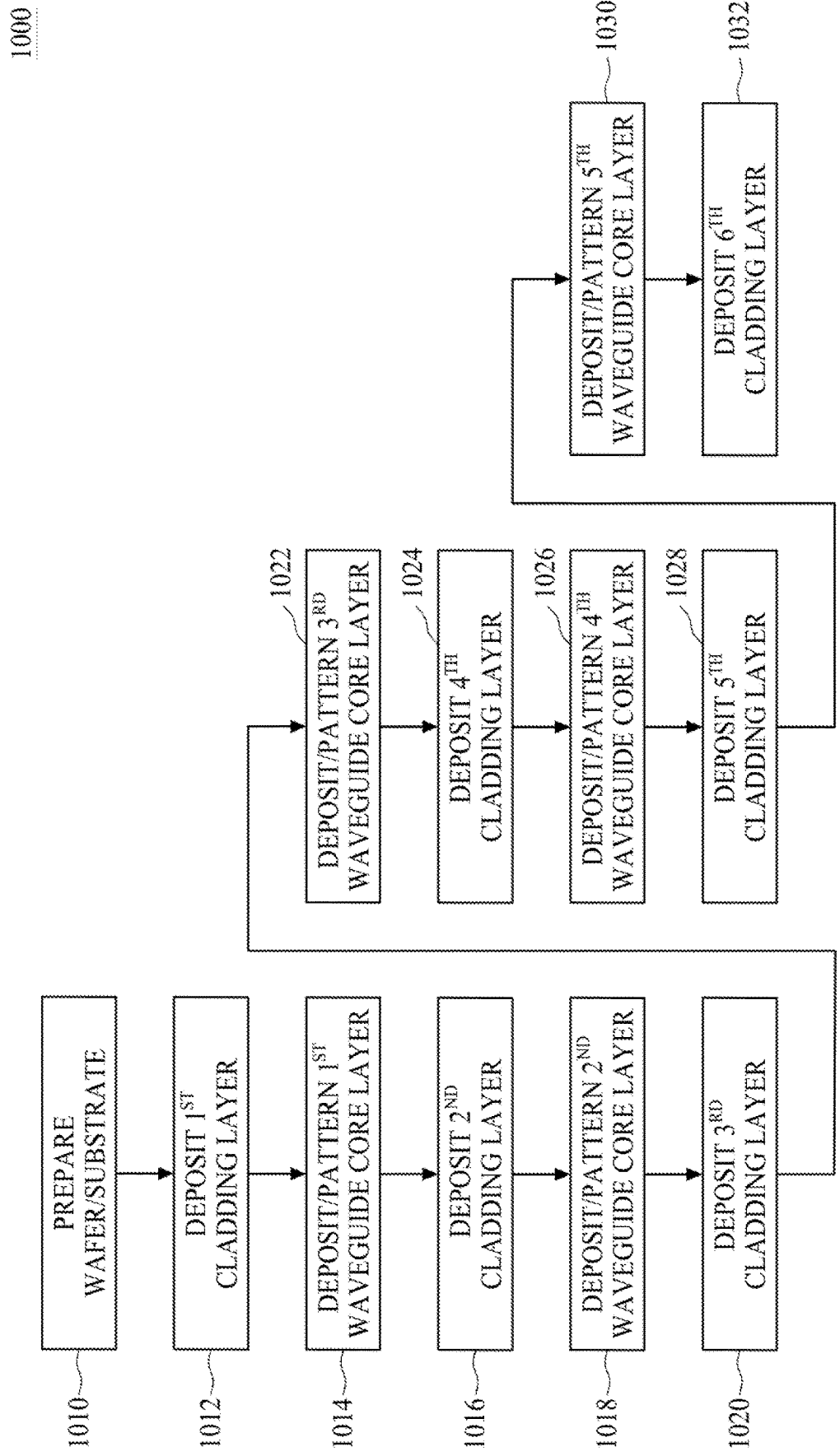
FIG. 10 is a flow chart showing a method of manufacturing a optical coupler in accordance with some embodiments disclosed herein.

With reference now to FIG. 10, the illustrated flowchart shows a semiconductor manufacturing process and/or method 1000 for manufacturing an optical coupler, for example, such as the optical coupler 200, in accordance with some embodiments disclosed herein.

At step 1010, the process or method 1000 may begin, in some suitable embodiments, with the preparation of a silicon wafer and/or other suitable substrate. For example, such preparation may include cleaning and/or inspecting of the wafer and/or substrate.

In some suitable embodiments, at step 1012, a first layer of cladding material, for example, such as silicon dioxide ($SiO_2$) and/or another suitable oxide or cladding material, may be deposited over the prepared wafer/substrate.

In some suitable embodiments, at step 1014, the first waveguide core layer 230 may be deposited and/or formed over the first layer of cladding material. For example, the first waveguide core layer 230 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1014 may include deposition of the waveguide core layer material and suitable patterning, for example, using photolithograph or the like, of the same to achieve the profile, shape, dimensions and/or geometry disclosed herein.

As shown, at step 1016, a second layer of cladding material, for example, such as silicon dioxide ($SiO_2$) and/or another suitable oxide or cladding material, may be deposited over the first waveguide core layer 230 and any underlying exposed portion of the first layer of cladding material. In some suitable embodiments, the second layer of cladding material may be the same material as the first layer of cladding material. Suitably, a thickness (for example, measured in a direction of the Z axis) of the deposited second layer of cladding material is controlled, regulated and/or adjusted such that a subsequently deposited and/or formed second waveguide core layer 232 is suitably spaced apart from the first waveguide core layer 230, for example, as disclosed herein.

In some suitable embodiments, at step 1018, the second waveguide core layer 232 may be deposited and/or formed over the second layer of cladding material. For example, the second waveguide core layer 232 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1018 may include deposition of the waveguide core layer material and suitable patterning, for example, using photolithograph or the like, of the same to achieve the profile, shape, dimensions and/or geometry disclosed herein.

As shown, at step 1020, a third layer of cladding material, for example, such as silicon dioxide ($SiO_2$) and/or another suitable oxide or cladding material, may be deposited over the second waveguide core layer 232 and any underlying exposed portion of the second layer of cladding material. In some suitable embodiments, the third layer of cladding material may be the same material as the second layer of cladding material. Suitably, a thickness (for example, measured in a direction of the Z axis) of the deposited third layer of cladding material is controlled, regulated and/or adjusted such that a subsequently deposited and/or formed third waveguide core layer 234 is suitably spaced apart from the first and/or second waveguide core layers 230 and 232, for example, as disclosed herein.

In some suitable embodiments, at step 1022, the third waveguide core layer 234 may be deposited and/or formed over the third layer of cladding material. For example, the third waveguide core layer 234 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1022 may include deposition of the waveguide core layer material and suitable patterning, for example, using photolithography or the like, of the same to achieve the profile, shape, dimensions and/or geometry disclosed herein.

As shown, at step 1024, a fourth layer of cladding material, for example, such as silicon dioxide ($SiO_2$) and/or another suitable oxide or cladding material, may be deposited over the third waveguide core layer 234 and any underlying exposed portion of the third layer of cladding material. In some suitable embodiments, the fourth layer of cladding material may be the same material as the third layer of cladding material. Suitably, a thickness (for example, measured in a direction of the Z axis) of the deposited fourth layer of cladding material is controlled, regulated and/or adjusted such that a subsequently deposited and/or formed fourth waveguide core layer 236 is suitably spaced apart from the first and/or third waveguide core layers 230 and 234, for example, as disclosed herein.

In some suitable embodiments, at step 1026, the fourth waveguide core layer 236 may be deposited and/or formed over the fourth layer of cladding material. For example, the fourth waveguide core layer 236 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1026 may include deposition of the waveguide core layer material and suitable patterning, for example, using photolithography or the like, of the same to achieve the profile, shape, dimensions and/or geometry disclosed herein.

As shown, at step 1028, a fifth layer of cladding material, for example, such as silicon dioxide ($SiO_2$) and/or another suitable oxide or cladding material, may be deposited over the fourth waveguide core layer 236 and any underlying exposed portion of the fourth layer of cladding material. In some suitable embodiments, the fifth layer of cladding material may be the same material as the fourth layer of cladding material. Suitably, a thickness (for example, measured in a direction of the Z axis) of the deposited fifth layer of cladding material is controlled, regulated and/or adjusted such that a subsequently deposited and/or formed fifth waveguide core layer 238 is suitably spaced apart from the first and/or fourth waveguide core layers 230 and 236, for example, as disclosed herein.

In some suitable embodiments, at step 1030, the fifth waveguide core layer 238 may be deposited and/or formed over the fifth layer of cladding material. For example, the fifth waveguide core layer 238 may be formed from and/or of a waveguide core material such as silicon nitride ($Si_3N_4$), silicon and/or another like material, suitably having an index of refraction $n_2$ which is greater than an index of refraction $n_1$ of the cladding material, at least for light having wavelengths at or near the operating wavelength of the light source 100, i.e., at or about the wavelength of the light emitted from the light source 100. In some suitable embodiments, step 1030 may include deposition of the waveguide core layer material and suitable patterning, for example, using photolithography or the like, of the same to achieve the profile, shape, dimensions and/or geometry disclosed herein.

As shown, at step 1032, a sixth layer of cladding material, for example, such as silicon dioxide ($SiO_2$) and/or another suitable oxide or cladding material, may be deposited over the fifth waveguide core layer 238 and any underlying exposed portion of the fifth layer of cladding material. In some suitable embodiments, the sixth layer of cladding material may be the same material as the fifth layer of cladding material. Suitably, a thickness (for example, measured in a direction of the Z axis) of the deposited sixth layer of cladding material is controlled, regulated and/or adjusted such that the fifth waveguide core layer 238 is adequately covered and/or encased in the cladding material, for example, as disclosed herein.

In the following, some further illustrative embodiments are described.

In some embodiments, an optical coupler includes: a plurality of waveguide core layers formed from a waveguide core material having a first index of refraction, the waveguide core layers being (i) arranged in a stacked relationship one over another, (ii) spaced apart one from another and (iii) extending from a light receiving end of the optical coupler longitudinally through the optical coupler toward a light output end of the optical coupler; and a cladding formed from a cladding material having a second index of refraction, the second index of refraction being less than the first index of refraction, the cladding material surrounding each of the plurality of waveguide core layers. Suitably, light propagating within outer ones of the plurality of waveguide core layers is directed toward an interior one of the plurality of waveguide core layers via evanescent coupling between adjacent ones of the plurality of waveguide core layers.

In some further embodiments, the plurality of waveguide core layers includes: a central waveguide core layer; a pair of outermost waveguide core layers arranged on opposite sides of the central waveguide core layer; and a pair of intermediate waveguide core layers arranged on opposite sides of the central waveguide core layer and interposed between the outermost waveguide core layers and the central waveguide core layer.

In still additional embodiments, the central waveguide core layer extends to the light output end of the optical coupler, while the pair of outermost waveguide core layers and the pair of intermediate waveguide core layers stop short of the light output end of the optical coupler.

In some embodiments, the central waveguide core layer has a first width at the light receiving end of the optical coupler and the outermost and intermediate pairs of waveguide core layers have a second width at the light receiving end of the optical coupler, the first and second widths being measured normal to a longitudinal axis of the optical coupler and said first width being greater than the second width.

In yet further embodiments, the central waveguide core layer tapers from the first width at the light receiving end of the optical coupler to a third width at the light output end of the optical coupler, the first width being greater than the third width; and the outermost and intermediate pairs of the waveguide core layers taper from the second width at the light receiving end of the optical coupler to the third width at locations distal from the light receiving end of the optical coupler, the second width being greater than the third width.

In some further embodiments, each of the pair of intermediate waveguide core layers is discontinuous along its longitudinal direction such that a second portion thereof is offset from a first portion thereof by a portion of the cladding.

In some embodiments, the plurality of waveguide core layers includes a first waveguide core layer, a second waveguide core layer arranged over the first waveguide core layer, a third waveguide core layer arranged over the second waveguide core layer, a fourth waveguide core layer arranged over the third waveguide core layer and a fifth waveguide core layer arranged over the fourth waveguide core layer.

In yet further embodiments, the second wave guide core layer is spaced apart from the first waveguide core layer by between 6% and 13%, inclusive, of a distance d, the third waveguide core layer is spaced apart from the first waveguide core layer by between 12% and 26%, inclusive, of the distance d, the fourth waveguide core layer is spaced apart from the first waveguide core layer by between 18% and 39%, inclusive, of the distance d, the fifth waveguide core layer is spaced apart from the first waveguide core layer by between 24% and 52%, inclusive, of the distance d, and the distance d is between 1 μm and 4 μm, inclusive.

In some embodiments, a photonic device or photonic integrated circuit (PIC) includes: a light source having a light emitting end from which light is emitted; and an optical coupler having a light receiving end facing the light emitting end of the light source to receive light emitted therefrom. The optical coupler has a light output end opposite the light receiving end and includes: a plurality of waveguide core layers formed from a waveguide core material having a first index of refraction, the waveguide core layers being (i) stacked one over another, (ii) spaced apart one from another and (iii) extending from the light receiving end of the optical coupler longitudinally through the optical coupler toward the light output end of the optical coupler; and a cladding formed from a cladding material having a second index of refraction, the second index of refraction being less than the first index of refraction, the cladding material surrounding each of the plurality of waveguide core layers. Each of at least two of the waveguide core layers is a discontinuous waveguide core that is discontinuous along its longitudinal direction such that a second portion thereof is offset from a first portion thereof by a gap within which is disposed a portion of the cladding In some further embodiments, the plurality of waveguide core layers includes: a central waveguide core layer; a pair of outermost waveguide core layers arranged on opposite sides of the central waveguide core layer; and a pair of intermediate waveguide core layers arranged on opposite sides of the central waveguide core layer and interposed between the outermost waveguide core layers and the central waveguide core layer.

In still further embodiments, the central waveguide core layer extends to the light output end of the optical coupler, while the pair of outermost waveguide core layers and the pair of intermediate waveguide core layers stop short of the light output end of the optical coupler.

In yet additional embodiments, the central waveguide core layer tapers from a first width at the light receiving end of the optical coupler to a third width at the light output end of the optical coupler, the first width being greater than the third width; and the outermost and intermediate pairs of the waveguide core layers taper from a second width at the light receiving end of the optical coupler to the third width at locations distal from the light receiving end of the optical coupler, the second width being greater than the third width and the first, second and third widths being measured normal to a longitudinal axis of the optical coupler.

In some further embodiments, the at least two discontinuous waveguide cores are the pair of intermediate waveguide core layers each of which is discontinuous along its longitudinal direction such that a second portion thereof is offset from a first portion thereof by a gap within which is disposed a portion of the cladding.

In some additional embodiments, the plurality of waveguide core layers includes a first waveguide core layer, a second waveguide core layer arranged over the first waveguide core layer, a third waveguide core layer arranged over the second waveguide core layer, a fourth waveguide core layer arranged over the third waveguide core layer and a fifth waveguide core layer arranged over the fourth waveguide core layer; and the second wave guide core layer is spaced apart from the first waveguide core layer by between 6% and 13%, inclusive, of a distance d, the third waveguide core layer is spaced apart from the first waveguide core layer by between 12% and 26%, inclusive, of the distance d, the fourth waveguide core layer is spaced apart from the first waveguide core layer by between 18% and 39%, inclusive, of the distance d, and the fifth waveguide core layer is spaced apart from the first waveguide core layer by between 24% and 52%, inclusive, of the distance d.

In some embodiments, the distance d is between 1 μm and 4 μm, inclusive.

In some embodiments, the light source is a laser diode and the light emitted from the light emitting end of the light source has a wavelength in a range of between 1260 nm and 1360 nm, inclusive.

In some further embodiments, the light emitting end of the light source and the light receiving end of the optical coupler are separated by a gap, the gap being filled with a filler material having an index of refraction in a range of between 1.1 and 3.9 inclusive, the filler material being one of a high dielectric constant material and sol-gel.

In still further embodiments, the core material is silicon nitride and the cladding material is silicon dioxide.

In yet further embodiments, a method of fabricating an optical coupler having a first light receiving end and a second light output end opposite the first light receiving end, includes: forming a cladding from a cladding material having a first index of refraction; and forming a plurality of waveguide core layers contained within the cladding from a core material having a second index of refraction greater than the first index of refraction. The waveguide core layers are (i) stacked one over another, (ii) spaced apart one from another and (iii) extend from the first light receiving end of the optical coupler longitudinally through the cladding toward the second light output end of the optical coupler. Suitably, the plurality of waveguide core layers are arranged such that light energy associated with light that enters outer ones of the plurality of waveguide core layers at the first light receiving end of the optical coupler is conveyed toward an interior one of the plurality of waveguide core layers via evanescent coupling between adjacent ones of the plurality of waveguide core layers.

In still one more embodiment, the waveguide core material is silicon nitride and the cladding material is silicon dioxide.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical coupler comprising:
   a plurality of waveguide core layers formed from a waveguide core material having a first index of refraction, said waveguide core layers being (i) arranged in a stacked relationship one over another, (ii) spaced apart one from another and (iii) extending from a light receiving end of the optical coupler longitudinally through the optical coupler toward a light output end of the optical coupler; and
   a cladding formed from a cladding material having a second index of refraction, said second index of refraction being less than the first index of refraction, said cladding material surrounding each of the plurality of waveguide core layers;
   wherein light propagating within outer ones of the plurality of waveguide core layers is directed toward an interior one of the plurality of waveguide core layers via evanescent coupling between adjacent ones of the plurality of waveguide core layers; and
   wherein the plurality of waveguide core layers comprises:
      a central waveguide core layer that extends from the light receiving end to the light output end of the optical coupler;
      a pair of outermost waveguide core layers arranged on opposite sides of the central waveguide core layer; and
      a pair of intermediate waveguide core layers arranged on opposite sides of the central waveguide core layer and interposed between the outermost waveguide core layers and the central waveguide core layer.

2. The optical coupler of claim 1, wherein the pair of outermost waveguide core layers and the pair of intermediate waveguide core layers stop short of the light output end of the optical coupler.

3. The optical coupler of claim 2, wherein the central waveguide core layer has a first width at the light receiving end of the optical coupler and the outermost and intermediate pairs of waveguide core layers have a second width at the light receiving end of the optical coupler, said first and second widths being measured normal to a longitudinal axis of the optical coupler and said first width being greater than the second width.

4. The optical coupler of claim 3, wherein:
   the central waveguide core layer tapers from the first width at the light receiving end of the optical coupler to a third width at the light output end of the optical coupler, said first width being greater than the third width; and
   the outermost and intermediate pairs of the waveguide core layers taper from the second width at the light receiving end of the optical coupler to the third width at locations distal from the light receiving end of the optical coupler, said second width being greater than the third width.

5. The optical coupler of claim 1, wherein each of the pair of intermediate waveguide core layers is discontinuous along its longitudinal direction such that a second portion thereof is offset from a first portion thereof by a gap within which is disposed a portion of the cladding.

6. The optical coupler of claim 1, wherein the plurality of waveguide core layers includes a first outermost waveguide core layer, a first intermediate waveguide core layer arranged over the first outermost waveguide core layer, the central waveguide core layer arranged over the first intermediate waveguide core layer, a second intermediate waveguide core layer arranged over the central waveguide core layer and a second outermost waveguide core layer arranged over the second intermediate waveguide core layer.

7. The optical coupler of claim 6, wherein the first intermediate waveguide core layer is spaced apart from the first outermost waveguide core layer by between 6% and 13%, inclusive, of a distance d, the central waveguide core layer is spaced apart from the first intermediate waveguide core layer by between 12% and 26%, inclusive, of the distance d, the second intermediate waveguide core layer is spaced apart from the first outermost waveguide core layer by between 18% and 39%, inclusive, of the distance d, the second outermost waveguide core layer is spaced apart from the first outermost waveguide core layer by between 24% and 52%, inclusive, of the distance d, and the distance d is between 1 μm and 4 μm, inclusive.

8. A photonic device comprising:
a light source having a light emitting end from which light is emitted; and
an optical coupler having a light receiving end facing the light emitting end of the light source to receive light emitted therefrom, said optical coupler having a light output end opposite the light receiving end and including:
a plurality of waveguide core layers formed from a waveguide core material having a first index of refraction, said waveguide core layers being (i) stacked one over another, (ii) spaced apart one from another and (iii) extending from the light receiving end of the optical coupler longitudinally through the optical coupler toward the light output end of the optical coupler; and
a cladding formed from a cladding material having a second index of refraction, said second index of refraction being less than the first index of refraction, said cladding material surrounding each of the plurality of waveguide core layers;
wherein each of at least two of the waveguide core layers is a discontinuous waveguide core that is discontinuous along its longitudinal direction such that a second portion thereof is offset from a first portion thereof by a gap within which is disposed a portion of the cladding and
wherein the plurality of waveguide core layers comprises:
a central waveguide core layer;
a pair of outermost waveguide core layers arranged on opposite sides of the central waveguide core layer; and
a pair of intermediate waveguide core layers arranged on opposite sides of the central waveguide core layer and interposed between the outermost waveguide core layers and the central waveguide core layer; and
wherein the central wavequde core layer extends to the light output end of the optical coupler, while the pair of outermost waveguide core layers and the pair of intermediate wavequde core layers stop short of the light output end of the optical coupler.

9. The photonic device of claim 8, wherein:
the central waveguide core layer tapers from a first width at the light receiving end of the optical coupler to a third width at the light output end of the optical coupler, said first width being greater than the third width; and
the outermost and intermediate pairs of the waveguide core layers taper from a second width at the light receiving end of the optical coupler to the third width at locations distal from the light receiving end of the optical coupler, said second width being greater than the third width and said first, second and third widths being measured normal to a longitudinal axis of the optical coupler.

10. The photonic device of claim 8, wherein the at least two discontinuous waveguide cores are the pair of intermediate waveguide core layers each of which is discontinuous along its longitudinal direction such that a second portion thereof is offset from a first portion thereof by a gap within which is disposed a portion of the cladding.

11. The photonic device of claim 8, wherein:
the plurality of waveguide core layers includes a first outermost waveguide core layer, a first intermediate waveguide core layer arranged over the first outermost waveguide core layer, the central waveguide core layer arranged over the first intermediate waveguide core layer, a second intermediate waveguide core layer arranged over the central waveguide core layer and a second outermost waveguide core layer arranged over the second intermediate waveguide core layer; and
the first intermediate waveguide core layer is spaced apart from the first outermost waveguide core layer by between 6% and 13%, inclusive, of a distance d, the central waveguide core layer is spaced apart from the first intermediate waveguide core layer by between 12% and 26%, inclusive, of the distance d, the second intermediatefourth waveguide core layer is spaced apart from the first outermost waveguide core layer by between 18% and 39%, inclusive, of the distance d, and the second outermost waveguide core layer is spaced apart from the first outermost waveguide core layer by between 24% and 52%, inclusive, of the distance d.

12. The photonic device of claim 11, wherein the distance d is between 1 μm and 4 μm, inclusive.

13. The photonic device of claim 8, wherein the light source is a laser diode and the light emitted from the light emitting end of the light source has a wavelength in a range of between 1260 nm and 1360 nm, inclusive.

14. The photonic device of claim 8, wherein the light emitting end of the light source and the light receiving end of the optical coupler are separated by a gap, said gap being filled with a filler material having an index of refraction in a range of between 1.1 and 3.9 inclusive, said filler material being one of a high dielectric constant material and sol-gel.

15. The photonic device of claim 8, wherein the waveguide core material is silicon nitride and the cladding material is silicon dioxide.

16. A method of fabricating an optical coupler having a first light receiving end and a second light output end opposite the first light receiving end, said method comprising:
forming a cladding from a cladding material having a first index of refraction; and
forming a plurality of waveguide core layers contained within the cladding from a core material having a second index of refraction greater than the first index of refraction, said waveguide core layers being (i) stacked one over another, (ii) spaced apart one from another and (iii) extending from the first light receiving end of the optical coupler longitudinally through the cladding toward the second light output end of the optical coupler;

wherein said plurality of waveguide core layers are arranged such that light energy associated with light that enters outer ones of the plurality of waveguide core layers at the first light receiving end of the optical coupler is conveyed toward an interior one of the plurality of waveguide core layers via evanescent coupling between adjacent ones of the plurality of waveguide core layers; and wherein the plurality of waveguide core layers comprises:
a central waveguide core layer that extends from the light receiving end to the light output end of the optical coupler;
a pair of outermost waveguide core layers arranged on opposite sides of the central waveguide core layer; and
a pair of intermediate waveguide core layers arranged on opposite sides of the central waveguide core layer and interposed between the outermost waveguide core layers and the central waveguide core layer.

17. The method of claim 16, wherein:
the core material is silicon nitride; and
the cladding material is silicon dioxide.

18. The method of claim 16, wherein the pair of outermost waveguide core layers and the pair of intermediate waveguide core layers stop short of the light output end of the optical coupler.

19. The method of claim 18, wherein the central waveguide core layer has a first width at the light receiving end of the optical coupler and the outermost and intermediate pairs of waveguide core layers have a second width at the light receiving end of the optical coupler, said first and second widths being measured normal to a longitudinal axis of the optical coupler and said first width being greater than the second width.

20. The method of claim 16, wherein each of the pair of intermediate waveguide core layers is discontinuous along its longitudinal direction such that a second portion thereof is offset from a first portion thereof by a gap within which is disposed a portion of the cladding.

* * * * *